US011509350B2

(12) United States Patent
Pezeshki et al.

(10) Patent No.: US 11,509,350 B2
(45) Date of Patent: Nov. 22, 2022

(54) METHODS AND APPARATUS TO FACILITATE HOPPING OF MEASUREMENT OCCASIONS FOR TRANSMISSIONS

(71) Applicant: QUALCOMM Incorporated, San Diego, CA (US)

(72) Inventors: Hamed Pezeshki, San Diego, CA (US); Tao Luo, San Diego, CA (US); Yan Zhou, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 16/988,505

(22) Filed: Aug. 7, 2020

(65) Prior Publication Data

US 2021/0050879 A1   Feb. 18, 2021

Related U.S. Application Data

(60) Provisional application No. 62/886,525, filed on Aug. 14, 2019.

(51) Int. Cl.
*H04B 1/7143* (2011.01)
*H04W 24/10* (2009.01)
(Continued)

(52) U.S. Cl.
CPC ......... *H04B 1/7143* (2013.01); *H04B 7/0626* (2013.01); *H04B 17/336* (2015.01);
(Continued)

(58) Field of Classification Search
CPC ..... H04B 1/7143; H04W 24/10; H04W 76/27
See application file for complete search history.

(56) References Cited

U.S. PATENT DOCUMENTS

2015/0016291 A1   1/2015   Kim et al.
2015/0288490 A1*  10/2015  Sun ................... H04W 72/0453
                                                  370/330
(Continued)

OTHER PUBLICATIONS

Huawei, et al., "Way Forward on IMR Collisions Randomization," 3GPP Draft, 3GPP TSG RAN WG1 #70bis, R1-124612 WF on IMR Collision Randomization, 3rd Generation Partnership Project (3GPP), Mobile Competence Centre, 650, Route Des Lucioles, F-06921, Sophia-Antipolis Cedex, France, vol. RAN WG1. No. San Diego. USA, Oct. 8, 2012-Oct. 12, 2012, Oct. 12, 2012 (Oct. 12, 2012), XP050662476, 7 pages, Retrieved from the Internet: URL: http://www.3gpp.org/ftp/tsg_ran/WG1_RL1/TSGR1_70b/Docs/ [retrieved on Oct. 12, 2012] Slides 1-7.

(Continued)

*Primary Examiner* — Zhiren Qin
(74) *Attorney, Agent, or Firm* — Procopio, Cory, Hargreaves & Savitch LLP

(57) ABSTRACT

Apparatus, methods, and computer readable media for facilitating of measuring occasions for transmissions based on frequency division multiplexing and spatial division multiplexing are disclosed herein. An example method for wireless communication at a UE includes receiving, from a base station, a hopping pattern indication configuring a hopping pattern. The example method also includes measuring interference of respective CSI-RS transmitted to other UEs included in a UE group based on at least the hopping pattern indication. The example method also includes reporting the measured interference to the base station. An example method for wireless communication at a base station includes transmitting a hopping pattern indication to each of a plurality of UEs. The example method also includes transmitting reference signals for the plurality of UEs using the hopping pattern among multiple subbands, and receiving (Continued)

a report of interference measured by each of the plurality of UEs based on the reference signals.

20 Claims, 11 Drawing Sheets

(51) Int. Cl.
H04B 17/336 (2015.01)
H04W 76/27 (2018.01)
H04B 7/06 (2006.01)
H04W 72/04 (2009.01)
H04L 5/00 (2006.01)
H04W 80/02 (2009.01)

(52) U.S. Cl.
CPC ............. *H04L 5/005* (2013.01); *H04W 24/10* (2013.01); *H04W 72/042* (2013.01); *H04W 72/0446* (2013.01); *H04W 76/27* (2018.02); *H04W 80/02* (2013.01)

(56) References Cited

U.S. PATENT DOCUMENTS

| | | | |
|---|---|---|---|
| 2016/0233938 A1 | 8/2016 | Mondal et al. | |
| 2016/0277081 A1* | 9/2016 | Wei | H04B 7/065 |
| 2018/0092075 A1 | 3/2018 | Kim et al. | |
| 2019/0059074 A1* | 2/2019 | Ozturk | H04W 52/0235 |
| 2019/0109732 A1* | 4/2019 | Choi | H04W 72/042 |
| 2019/0207657 A1* | 7/2019 | Cao | H04W 72/04 |
| 2020/0228182 A1* | 7/2020 | Nilsson | H04B 7/0647 |
| 2021/0119680 A1* | 4/2021 | Matsumura | H04L 5/0057 |

OTHER PUBLICATIONS

International Search Report and Written Opinion—PCT/US2020/045644—ISA/EPO—dated Dec. 23, 2020 (17 pages).

QUALCOMM Incorporated: "Details of CSI Acquisition," 3GPP Draft, 3GPP TSG RAN WG1 NR Ad-Hoc#2, R1-1711163, 3rd Generation Partnership Project (3GPP), Mobile Competence Centre, 650, Route Des Lucioles, F-06921, Sophia-Antipolis Cedex, France, vol. RAN WG1, No. Qingdao, China, Jun. 27, 2017-Jun. 30, 2017, Jun. 17, 2017 (Jun. 17, 2017), XP051305444, pp. 1-5, Retrieved from the Internet: URL: http://www.3gpp.org/ftp/tsg_ran/WG1_RL1/TSGR1_AH/NR_AH_1706/Docs/ [retrieved on-Jun. 17, 2017] Whole session 2.

Spreadtrum Communications: "NZP CSI-RS for Interference Measurement," 3GPP Draft, 3GPP TSG RAN WG1 Meeting 90bis, R1-1717754, NZP CSI-RS for Interference Measurement Final, 3rd Generation Partnership Project (3GPP), Mobile Competence Centre, 650, Route Des Lucioles, F-06921, Sophia-Antipolis Cedex, France, vol. RAN WG1. No. Prague, CZ, Oct. 9, 2017-Oct. 13, 2017, Oct. 2, 2017 (Oct. 2, 2017), XP051352292, 3 pages, Retrieved from the Internet: URL: http://www.3gpp.org/ftp/tsg_ran/WG1_RL1/TSGR1_90b/Docs/ [retrieved on Oct. 2, 2017] Sect. 1-3.

* cited by examiner

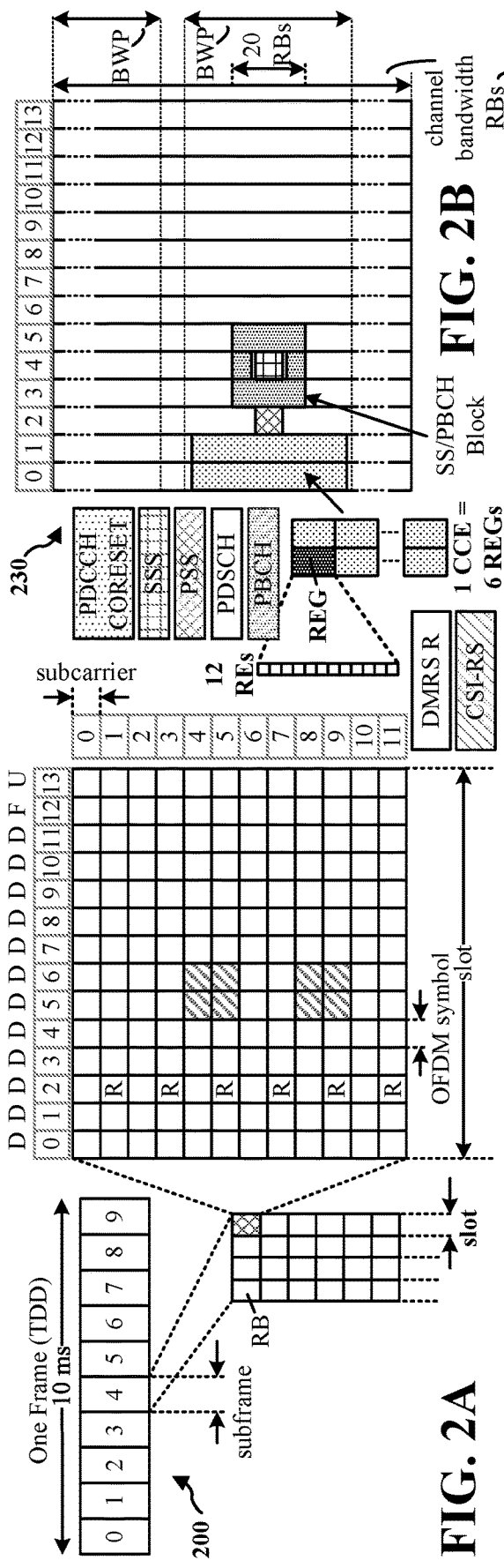
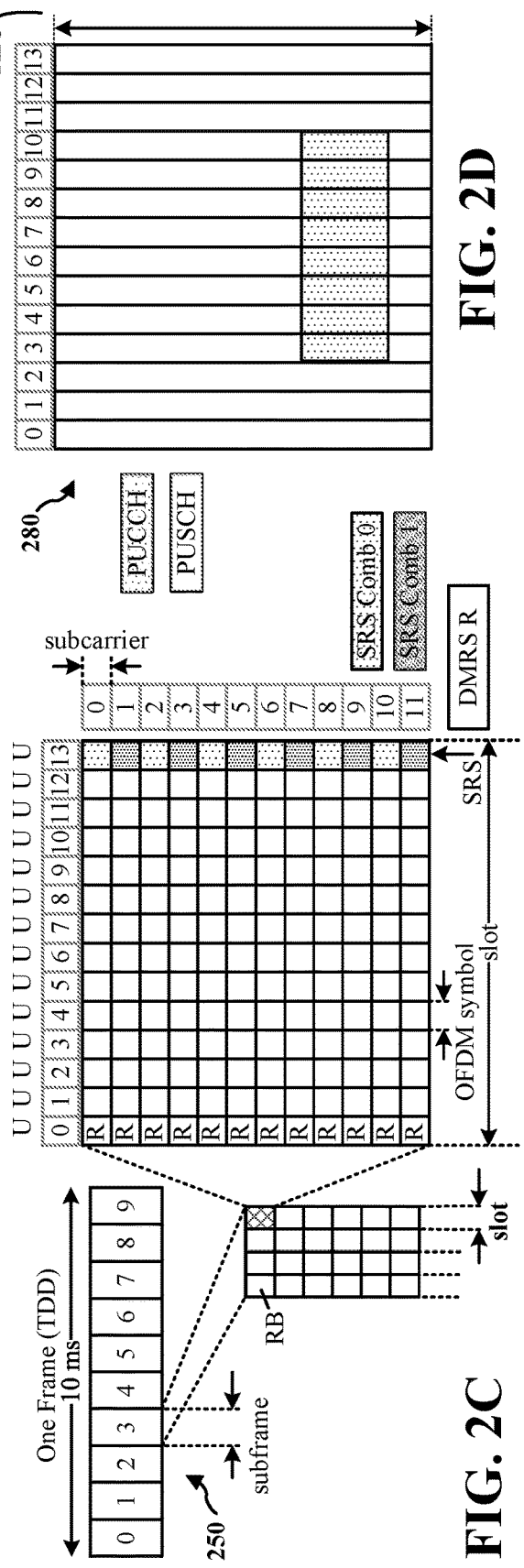
FIG. 2A
FIG. 2B
FIG. 2C
FIG. 2D

METHODS AND APPARATUS TO FACILITATE HOPPING OF MEASUREMENT OCCASIONS FOR TRANSMISSIONS

CROSS REFERENCE TO RELATED APPLICATION(S)

This application claims the benefit of U.S. Provisional Patent Application Ser. No. 62/886,525, entitled "METHODS AND APPARATUS TO FACILITATE HOPPING OF MEASUREMENT OCCASIONS FOR TRANSMISSIONS," and filed on Aug. 14, 2019, which is expressly incorporated by reference herein in its entirety.

BACKGROUND

Technical Field

The present disclosure relates generally to communication systems, and more particularly, to interference measurements.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For some communication applications, like communications related to Internet of Things (IoT) devices used in industrial related applications, it may be beneficial to support a certain number of devices within a specific delay budget. To increase the number of devices that may be served, it may be beneficial to employ techniques such as multiplexing. For example, a base station may determine to schedule communications jointly with multiple devices. However, as the number of devices in communication with the base station increases, the combination of subbands and transmit beams may increase at an increasing rate.

Example techniques disclosed herein facilitate signaling of a hopping pattern (e.g., a hopping pattern indication) to a plurality of UEs. The hopping pattern indication may indicate a predetermined hopping pattern and may be provided to a plurality of UEs by a base station via multicast or broadcast transmissions. In some examples, the base station may use RRC signaling to configure and activate the hopping pattern(s) at the plurality of UEs. In some examples, the base station may use RRC signaling to configure the hopping pattern(s) at the plurality of UEs and employ MAC-CE or DCI to activate the hopping pattern(s) at the plurality of UEs.

Example techniques disclosed herein facilitate hopping of measurement occasions for transmissions based on frequency and spatial multiplexing. For example, techniques disclosed herein facilitate a base station grouping user equipment (UEs) based on their spatial characteristics within a subband. In some examples, transmissions for UEs within a same UE group may be multiplexed within a subband while transmissions for UEs that are not within the same UE group may not be multiplexed. Accordingly, the total number of combinations of subbands and transmit beams that may be considered for scheduling by the base station may be reduced.

In an aspect of the disclosure, a method, a computer-readable medium, and an apparatus are provided for wireless communication at a base station. An example apparatus transmits a hopping pattern indication to each of a plurality of UEs, the hopping pattern indication configuring a hopping pattern for the plurality of UEs. The example apparatus also transmits reference signals for the plurality of UEs using the hopping pattern among multiple subbands. Additionally, the example apparatus receives a report of interference measured by each of the plurality of UEs based on the reference signals.

In another aspect of the disclosure, a method, a computer-readable medium, and an apparatus are provided for wireless communication at a user equipment (UE). The apparatus receives, from a base station, a hopping pattern indication configuring a hopping pattern. The example apparatus also measures interference of respective channel state information (CSI) reference signals (RS) transmitted to other UEs included in a UE group based on at least the hopping pattern indication. Additionally, the example apparatus reports the measured interference to the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
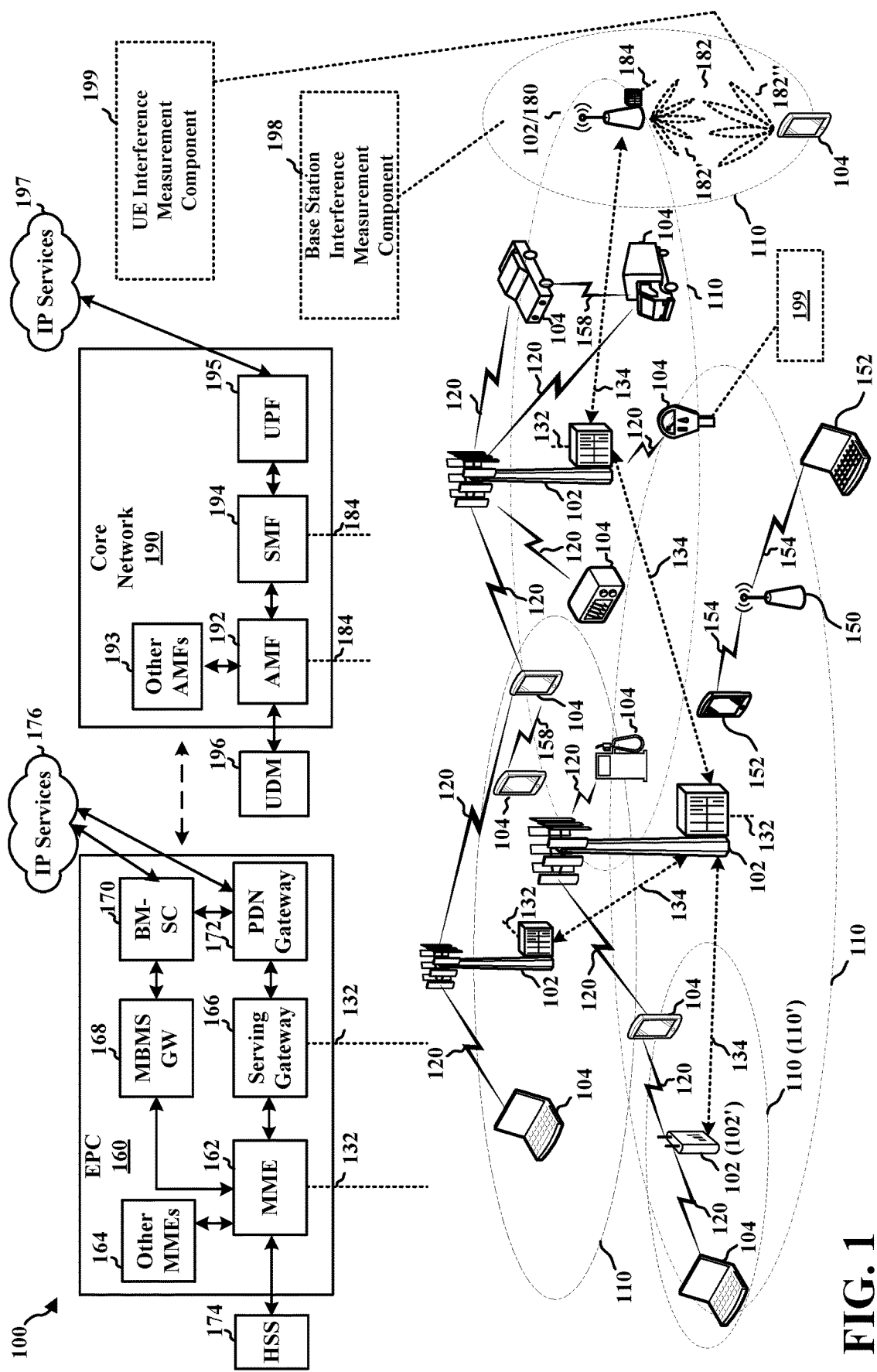
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100 comprising base stations 102, base stations 180, and UEs 104.

In certain aspects, a base station may be configured to manage one or more aspects of wireless communication via hopping of measurement occasions for transmissions based on frequency and spatial multiplexing. As an example, in FIG. 1, the base station 180 may include a base station interference measurement component 198 configured to transmit a hopping pattern indication to each of a plurality of UEs, the hopping pattern indication configuring a hopping pattern for the plurality of UEs. The example base station interference measurement component 198 may also be configured to transmit reference signals for the plurality of UEs using the hopping pattern among multiple subbands. The example base station interference measurement component 198 may also be configured to receive a report of interference measured by each of the plurality of UEs based on the reference signals.

Still referring to FIG. 1, in certain aspects, the UE 104 may be configured to manage one or more aspects of wireless communication via hopping of measurement occasions for transmissions based on frequency and spatial multiplexing. As an example, in FIG. 1, the UE 104 may include a UE interference measurement component 199 configured to receive, from a base station, a hopping pattern indication configuring a hopping pattern. The example UE interference measurement component 199 may also be configured to measure interference of respective channel state information (CSI) reference signals (RS) transmitted to other UEs included in a UE group based on at least the hopping pattern indication. The example UE interference measurement component 199 may also be configured to report the measured interference to the base station.

Although the following description may provide examples based on 5G/NR, it may be appreciated that the concepts described herein may be applicable to other communication technologies. For example, the concepts described herein may be applicable to LTE, LTE-A, CDMA, GSM, and/or other wireless technologies (or RATs) in which a base station may multiplex communication links to a plurality of UEs.

The wireless communications system (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
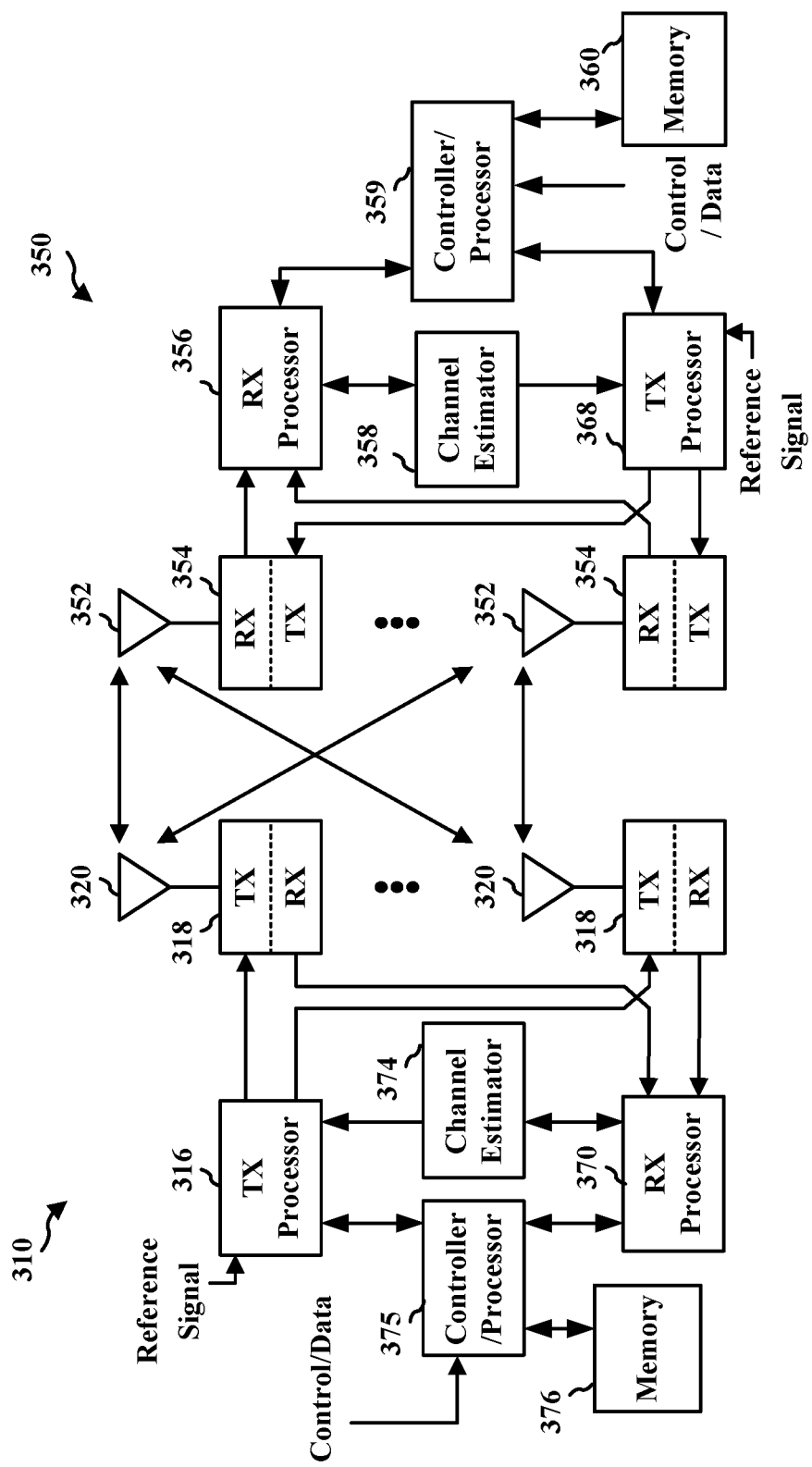
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the base station interference measurement component 198 of FIG. 1.

At least one of the TX processor 368, the RX processor 356, and the controller/processor 359 may be configured to perform aspects in connection with the UE interference measurement component 199 of FIG. 1.

For some communication applications, like communications related to IoT devices used in industrial related applications, it may be beneficial to support a certain number of devices within a specific delay budget. For example, with respect to packing machines used for automation, a base station may support 50 UEs with a delay budget of approximately 1 ms (e.g., a data packet should be correctly delivered to a UE within 1 ms or else the data packet is considered to be expired). To increase the number of devices that may be served, it may be beneficial to employ techniques such as multiplexing. For example, a base station may determine to schedule communications jointly with multiple devices. However, as the number of devices in communication with the base station increases, the combination of subbands and transmit beams may increase at an increasing rate.

One way to increase the number of UEs is to perform frequency division multiplexing (FDM) where multiplexing is performed using different subbands. Another way to increase the number of UEs is to perform spatial division multiplexing (SDM) (sometimes referred to as analog beamforming-based MU-MIMO) where multiplexing is performed using different beams. Example techniques disclosed herein facilitate performing multiplexing combining FDM and SDM. For example, a frequency range, such as FR2, may be divided into different subbands, and each subband may include different transmit beams.

As the number of subbands increases within a communications environment and the number of beams within a subband increases, the number of dimensions in terms of subband and beam combinations also increases. For example, a base station may be configured to communicate using eight subbands and each subband may include four beams. As a result, there may be 32 dimensions (or subband and beam combinations) that the base station may use to transmit a packet. Thus, it may be appreciated that it is beneficial for the base station to determine the correct subband and to determine the correct transmit beam within the subband to use for transmitting a packet to a UE. It may also be appreciated that measuring each subband and each beam within each subband may quickly become unwieldy. For example, using periodic CSI-RS or semi-persistent CSI-RS may result in too many individual configurations for measurements, which may increase the overhead.

Example techniques disclosed herein facilitate signaling of a hopping pattern (e.g., a hopping pattern indication) to a plurality of UEs. The hopping pattern indication may indicate a predetermined hopping pattern and may be provided to a plurality of UEs by a base station via multicast or broadcast transmissions. In some examples, the base station may use RRC signaling to configure and activate the hopping pattern(s) at the plurality of UEs. In some examples, the base station may use RRC signaling to configure the hopping pattern(s) at the plurality of UEs and employ MAC-CE or DCI to activate the hopping pattern(s) at the plurality of UEs.

Techniques disclosed herein enable a base station to define two or more UE groups and to group a plurality of UEs into the different UE groups. In some examples, the base station may group the UEs based on their spatial characteristics within a subband. In some examples, transmissions for UEs within a same UE group may be multiplexed within a subband while transmissions for UEs that are in different UE groups may not be multiplexed (e.g., UEs within a same UE group can be spatially multiplexed). Accordingly, the techniques disclosed herein facilitate reducing the total number of combinations of subbands and transmit beams that may be considered for scheduling by the base station as the base station may employ the configured hopping patterns.

Figure 4:
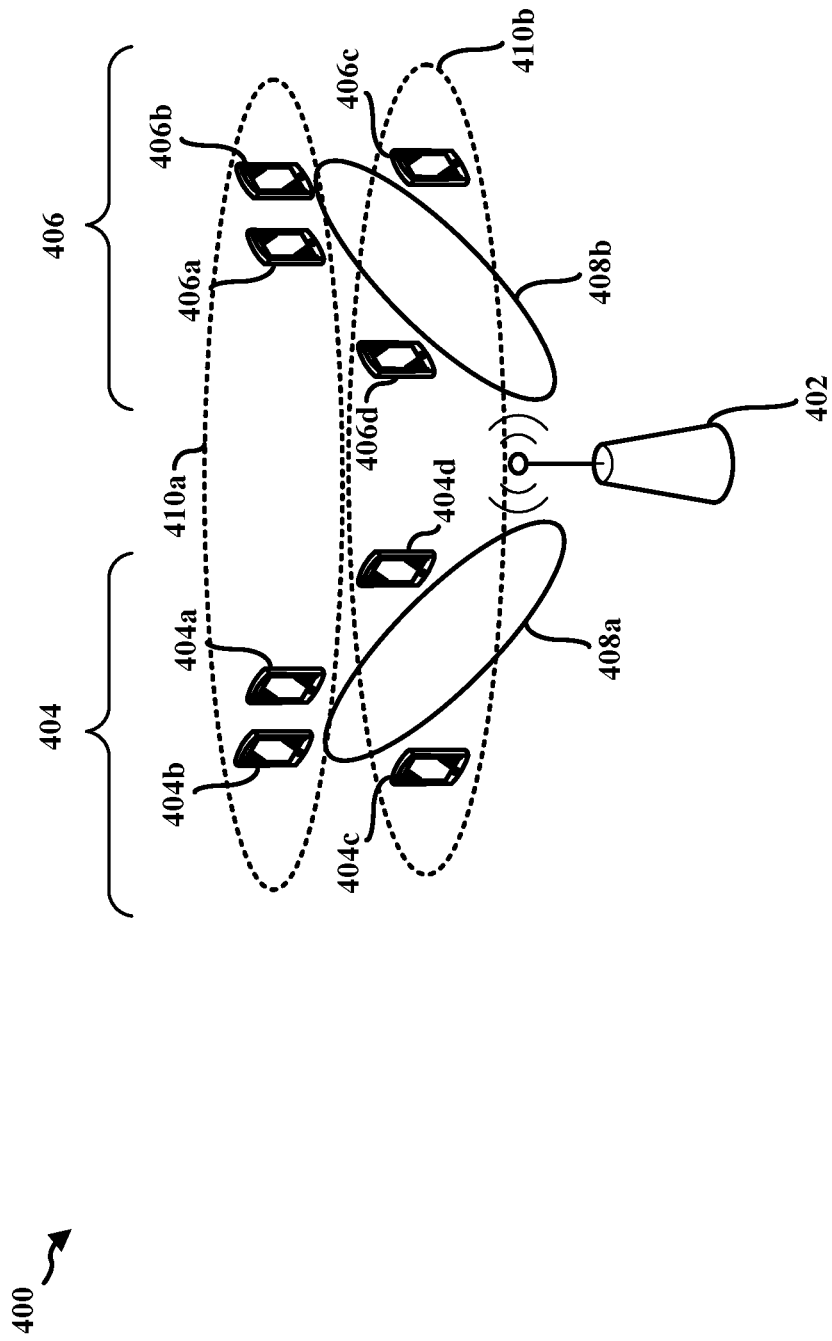
FIG. 4 is a diagram illustrating grouping of UEs into UE groups, in accordance with the teachings disclosed herein.

FIG. 4 illustrates an example of wireless communication 400 between a base station 402 a plurality of UEs 404, 406, in accordance with the teachings disclosed herein. In the illustrated example of FIG. 4, the base station 402 communicates with a first set of UEs 404 (e.g., a first UE 404a, a second UE 404b, a third UE 404c, and a fourth UE 404d) via a first beam 408a. The example base station 402 also communicates with a second set of UEs 406 (e.g., a fifth UE 406a, a sixth UE 406b, a seventh UE 406c, and an eighth UE 406d) via a second beam 408b. It may be appreciated that each of the UEs of the first set of UEs 404 share and/or have similar spatial characteristics and that each of the UEs of the second set of UEs 406 share and/or have similar spatial characteristics. For example, each of the UEs of the first set of UEs 404 may be positioned within a shared location relative to the base station 402, and each of the UEs of the second set of UEs 406 may be positioned within a shared location relative to the base station 402.

In the illustrated example of FIG. 4, the base station 402 may group the plurality of UEs 404, 406 into different groups of UEs. For example, the base station 402 may group the plurality of UEs 404, 406 into different UE groups based on spatial characteristics. In the illustrated example, the base station 402 groups the plurality of UEs 404, 406 into two different UE groups, including a first UE group 410a and a second UE group 410b, and the UEs within a respective UE group can be spatially multiplexed within a subband. For example, the base station 402 may group the first UE 404a and the second UE 404b (of the first set of UEs 404) and the fifth UE 406a and the sixth UE 406b (of the second set of UEs 406) into the first UE group 410a. The base station 402 may also group the third UE 404c and the fourth UE 404d (of the first set of UEs 404) and the seventh UE 406c and the eighth UE 406d (of the second set of UEs 406) into the second UE group 410b. In some examples, the base station 402 may randomly group the UEs of the respective sets of UEs 404, 406 into the two UE groups 410a, 410b. For example, as the spatial characteristics of the UEs of the first set of UEs 404 are relatively the same, and differences with respect to multiplexing may be nominal and, thus, may be disregarded with respect to multiplexing. However, it may be appreciated that in other examples, additional or alternative techniques for grouping the plurality of UEs may be utilized.

Although the illustrated example of FIG. 4 includes two different UE groups 410a, 410b, in additional or alternative examples, the base station 402 may group the plurality of UEs 404, 406 into any suitable quantity of UE groups. For example, the base station 402 may group the plurality of UEs 404, 406 into one UE group, three different UE groups, four different UE groups, etc.

Furthermore, while the illustrated example of FIG. 4 includes two sets of UEs 404, 406 including four UEs in each set, in additional or alternative examples, the wireless communication 400 may include any suitable quantity of sets of UEs including any suitable quantity of UEs in each set. For example, a wireless communication may include a first set of UEs including two UEs, a second set of UEs including four UEs, and a third set of UEs including ten UEs.

Example techniques disclosed herein also define a hopping pattern that identifies different subband and slot combinations within which particular UE groups may perform interference measurement. The hopping pattern may include a pattern of hopping among frequency subbands over time. For example, for a particular subband and slot combination, the hopping pattern may specify that UEs within a first UE group may perform interference measurement, and for a different subband and slot combination, the hopping pattern may specify that UEs within a second UE group may perform interference measurement.

Figure 5:
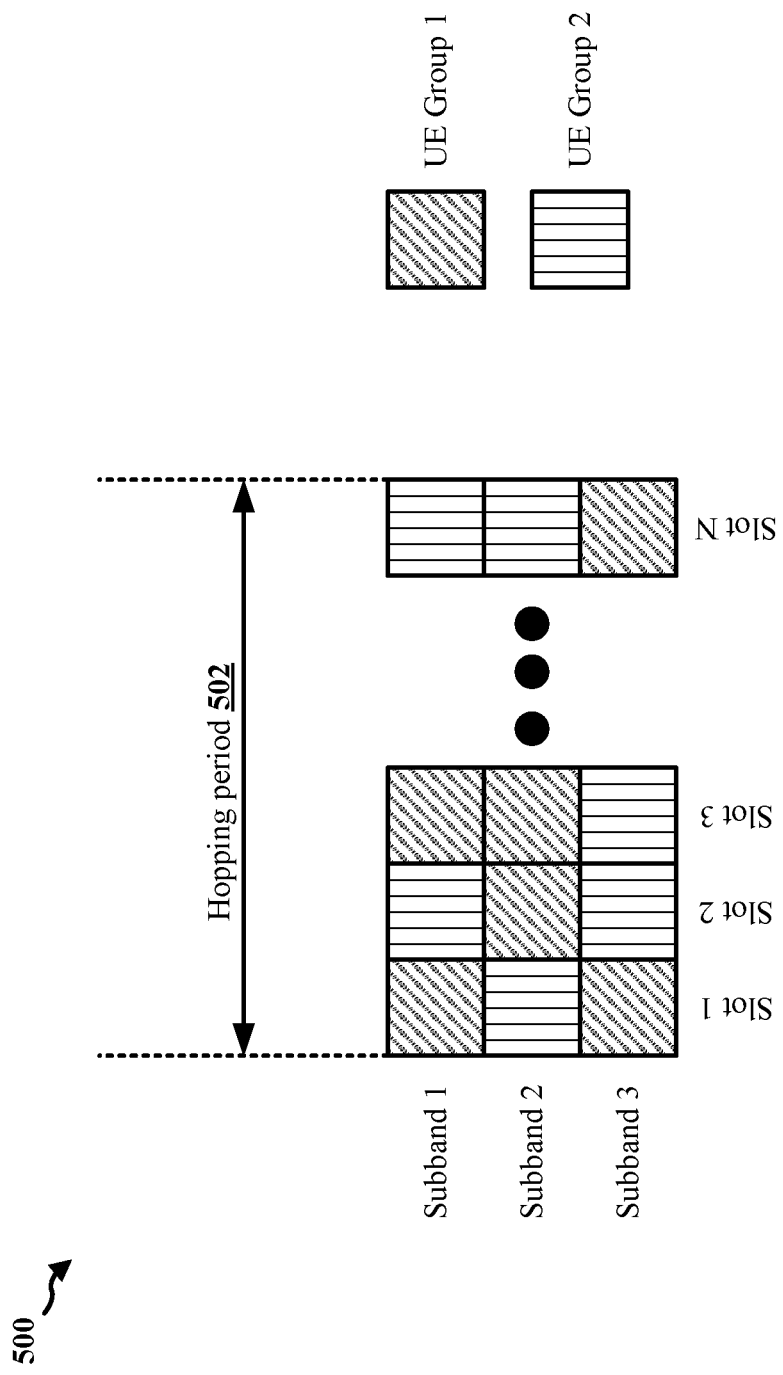
FIG. 5 is a diagram illustrating an example hopping pattern, in accordance with the teachings disclosed herein.

For example, FIG. 5 illustrates an example hopping pattern 500, in accordance with the teachings disclosed herein. The hopping pattern 500 may be configured and activated at a plurality of UEs by a base station using RRC signaling. In some examples, a base station may use RRC signaling to configure the hopping pattern 500 at a plurality of UEs and employ MAC-CE or DCI to activate the hopping pattern 500 at the plurality of UEs (e.g., at a later time). The example hopping pattern 500 includes a hopping period 502. In the illustrated example of FIG. 5, the hopping pattern 500 defines which UEs may perform interference measurements within which subband and slot combination. For example, within subband 1 and subband 3 of slot 1, the one or more UEs of UE group 1 (e.g., the first UE group 410a of FIG. 4) may perform interference measurements, within subband 2 of slot 1, the one or more UEs of UE group 2 (e.g., the second UE group 410b of FIG. 4) may perform interference measurements, etc.

Example techniques disclosed herein also provide example techniques for facilitating the UEs to perform the interference measurement. For example, based on the hopping pattern, the one or more UEs within a first UE group may perform interference measurement. In some such examples, the base station may transmit a reference signal to each of the UEs within the first UE group using different resources and certain ones of the UEs may perform the interference measurement. For example, the first UE group may include four UEs. In some such examples, the base station may transmit a first reference signal (e.g., a CSI-RS) to a first one of the four UEs and the remaining three UEs of the first UE group may perform the interference measurement corresponding to the first reference signal. The base station may then transmit a second reference signal to a second one of the four UEs and the remaining three UEs of the first UE group may perform the interference measurement corresponding to the second reference signal, etc. The respective four UEs of the first UE group may then report the interference measurements to the base station, which subsequently decides, based on the interference measurement reports, which UEs can be scheduled jointly (or multiplexed).

Figure 6A:
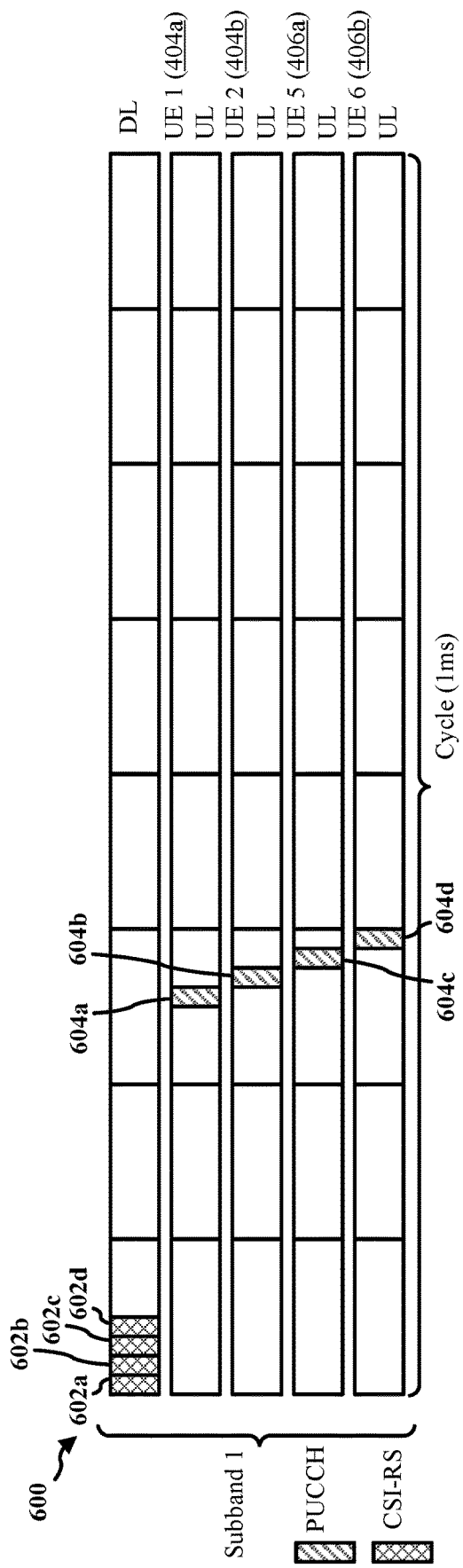
FIGS. 6A and 6B are diagrams illustrating example interference measurement patterns utilized by UE groups, in accordance with the teachings disclosed herein.
Figure 6B:
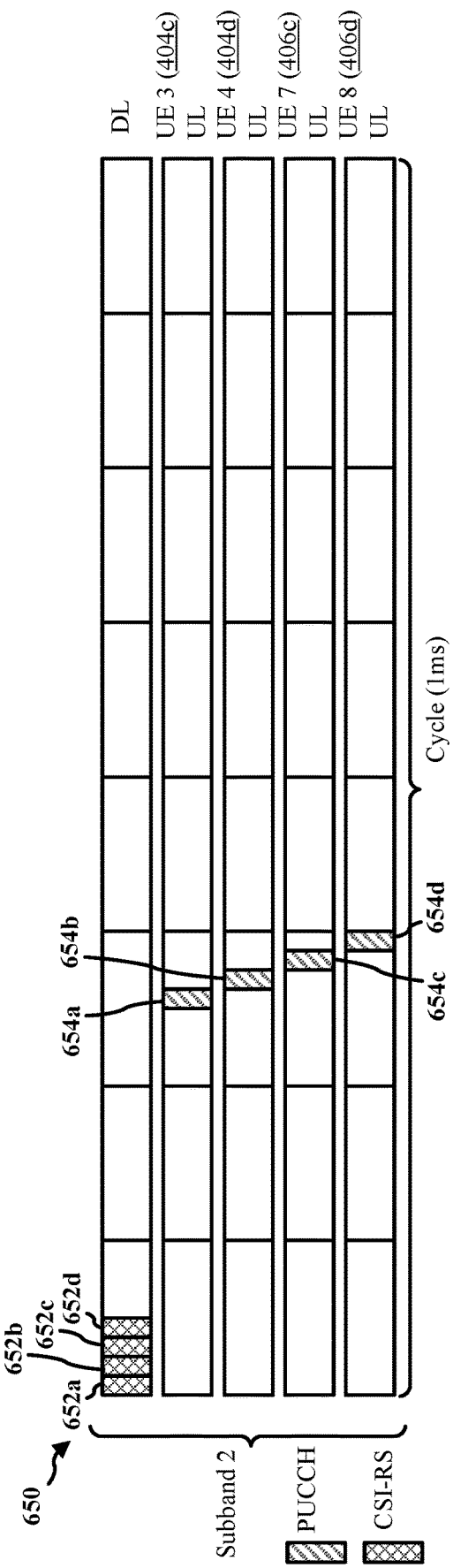

FIGS. 6A and 6B illustrate example interference measurement patterns 600, 650, respectively, utilized by different UE groups, in accordance with the teachings disclosed herein. The example interference measurement patterns 600, 650 illustrate how different UEs may perform interference measurements within a respective subband.

For example, the example interference measurement pattern 600 of FIG. 6A illustrates how the UEs of a first group of UEs (e.g., the first UE group 410a of FIG. 4) perform interference measurement within a first subband (e.g., the subband 1). In the example, a base station transmits four downlink reference signals (e.g., CSI-RS) to the different UEs of the first UE group 410a. For example, the base station may transmit a first reference signal 602a to the first UE 404a during a first symbol, may transmit a second reference signal 602b to the second UE 404b during a second symbol, may transmit a third reference signal 602c to the fifth UE 406a during a third symbol, and may transmit a fourth reference signal 602d to the sixth UE 406b during a fourth symbol.

In the example of FIG. 6A, when the base station transmits a reference signal to a particular UE, the remaining UEs of the UE group perform interference measurement based on the reference signal transmitted to the particular UE. For example, when the base station transmits the first reference signal 602a to the first UE 404a, the remaining UEs of the first UE group 410a (e.g., the second UE 404b, the fifth UE 406a, and the sixth UE 406b) measure the interference corresponding to the first reference signal 602a. Similarly, when the base station transmits the second reference signal 602b to the second UE 404b, the remaining UEs of the first UE group 410a (e.g., the first UE 404a, the fifth UE 406a, and the sixth UE 406b) measure the interference corresponding to the second reference signal 602b. The interference measurements are then repeated for the third and fourth reference signals 602c, 602d, respectively. In some examples, the UE receiving the reference signal may also measure inter-cell interference related to the receiving of the reference signal.

The example interference measurement pattern 650 of FIG. 6B illustrates how the UEs of a second group of UEs (e.g., the second UE group 410b of FIG. 4) perform interference measurement within a second subband (e.g., the subband 2). In the illustrated example, the base station transmits four downlink reference signals (e.g., CSI-RS) to the different UEs of the second UE group 410b. For example, the base station may transmit a first reference signal 652a to the third UE 404c during a first symbol, may transmit a second reference signal 652b to the fourth UE 404d during a second symbol, may transmit a third reference signal 652c to the seventh UE 406c during a third symbol, and may transmit a fourth reference signal 652d to the eighth UE 406d during a fourth symbol.

In the example of FIG. 6B, when the base station transmits the first reference signal 652a to the third UE 404c, the remaining UEs of the second UE group 410b (e.g., the fourth UE 404d, the seventh UE 406c, and the eighth UE 406d) measure the interference corresponding to the first reference signal 652a. Similarly, when the base station transmits the second reference signal 652b to the fourth UE 404d, the remaining UEs of the second UE group 410b (e.g., the third UE 404c, the seventh UE 406c, and the eighth UE 406d) measure the interference corresponding to the second reference signal 652b. The interference measurements are then repeated for the third and fourth reference signals 652c, 652d, respectively.

It may be appreciated that as the interferences measured by the UEs are based on reference signals transmitted to other UEs within the same UE group, the measured interferences may correspond to mutual interference between the different UEs in the group. However, it may also be appreciated that in some examples, the interferences measured by the UEs may correspond to inter-cell interference.

In the illustrated examples of FIGS. 6A and 6B, the respective UEs may then report their measured interferences to the base station. For example, with respect to the interference measurement pattern 600 of FIG. 6A, the first UE 404a, the second UE 404b, the fifth UE 406a, and the sixth UE 406b each transmit their respective interference measurement reports 604a, 604b, 604c, 604d to the base station for the subband 1. Similarly, with respect to the interference measurement pattern 650 of FIG. 6B, the third UE 404c, the fourth UE 404d, the seventh UE 406c, and the eighth UE 406d each transmit their respective interference measurement reports 654a, 654b, 654c, 654d to the base station for the subband 2. In the illustrated example, the interference measurement reports 604a-d, 654a-d may be uplink transmissions transmitted by the respective UEs via PUCCH.

Figure 7:
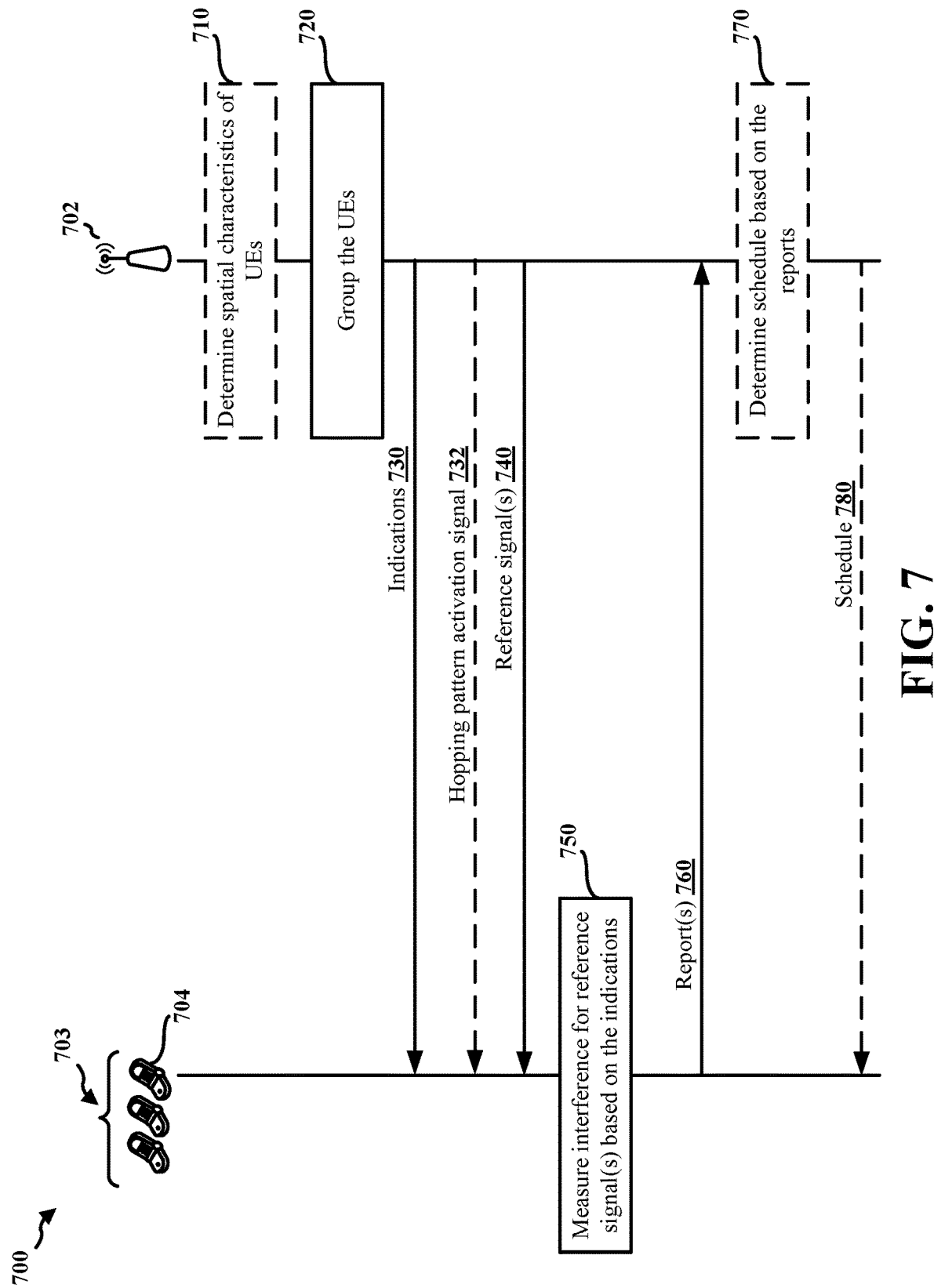
FIG. 7 is an example communication flow between a base station and a UE, in accordance with the teachings disclosed herein.

FIG. 7 illustrates an example communication flow 700 between a base station 702 and a plurality of UEs 703 including a UE 704, as presented herein. In the illustrated example, the communication flow 700 facilitates the signaling of a predetermining hopping pattern to the group of UEs 703. Aspects of the base station 702 may be implemented by the base station 102/180 of FIG. 1, the base station 310 of FIG. 3, and/or the base station 402 of FIG. 4. Aspects of the UE 704 may be implemented by the UE 104 of FIG. 1, the UE 350 of FIG. 3, and/or the UEs 404, 406 of FIG. 4. Although not shown in the illustrated example of FIG. 7, it may be appreciated that in additional or alternative examples, the base station 702 may be in communication with one or more other base stations or UEs, and/or the UE 704 may be in communication with one or more other base stations or UEs. It may be appreciated that in other examples, the plurality of UEs 703 may comprise any suitable quantity of UEs, such as one UE, two UEs, four UEs, etc.

In the illustrated example of FIG. 7, the base station 702 may determine, at 710, spatial characteristics of UEs in communication with the base station 702. For example, the base station 702 may determine the spatial characteristics of the one or more UEs of the plurality of UEs 703. In some examples, the base station 702 may determine which UEs are being served by which beams to determine the respective spatial characteristics. For example, referring to FIG. 4, the base station 402 may determine that the one or more UEs of the first set of UEs 404 have similar spatial characteristics and that the one or more UEs of the second set of UEs 406 have similar spatial characteristics. In some examples, the spatial characteristics of the UEs may include determining which UEs are within a same synchronization signal block (SSB) index (or beam index) and which UEs are within different SSB indices. In some examples, the spatial characteristics may include determining which UEs are being served by a same wide beam. It may be appreciated that UEs within a same SSB index may be served by a same beam and, thus, UEs being served by different wide beams may be located spatially apart from each other. For example, referring to FIG. 4, the UEs 404 being served by the first beam 408a may be located spatially apart from the UEs 406 being served by the second beam 408b.

The base station 702 may then group, at 720, the plurality of UEs 703. In some examples, the base station 702 may group the plurality of UEs 703 based on the determined spatial characteristics and a number of UE groups. For example, referring to FIG. 4, the base station 402 may determine to group the plurality of UEs 404, 406 into two groups. The example base station 402 may then randomly group the UEs of the first set of UEs 404 into the first and second UE groups 410a, 410b, respectively, and also randomly group the UEs of the second set of UEs 406 into the first and second UE groups 410a, 410b, respectively. In some examples, the base station 702 may group the UEs so that at least one of the UEs in each of the groups are located sufficiently apart to satisfy beam separation criteria for applying spatial division multiplexing. For example, the first UE group 410a includes at least one UE being served by the first beam 408a (e.g., the first UE 404a and the second UE 404b) and at least one UE being served by the second beam 408b (e.g., the fifth UE 406a and the sixth UE 406b). Similarly, the second UE group 410b includes at least one UE being served by the first beam 408a (e.g., the third UE 404c and the fourth UE 404d) and at least one UE being served by the second beam 408b (e.g., the seventh UE 406c and the eighth UE 406d). However, it may be appreciated that other techniques for grouping the different UEs into different UE groups may additionally or alternatively be used.

In the illustrated example, the base station 702 transmits indications 730 regarding the groupings and a hopping pattern to the UE 704 and the plurality of UEs 703. The base station 702 may transmit the indications 730 via RRC signaling, via a MAC control element (MAC-CE), and/or via DCI signaling. In some examples, the base station 702 may transmit the indications 730 to the UE 704 and the plurality of UEs 703 and activate the respective hopping pattern via RRC signaling. In some examples, the base station 702 may transmit the indications 730 to the UE 704 and the plurality of UEs 703 via RRC signaling and activate the hopping pattern (indicated by the indications 730) at a later time. For example, the base station 702 may transmit hopping pattern activation signal 732 using a MAC-CE or using DCI at a later time (e.g., after the transmitting of the indications 730) to activate the hopping pattern indicated by the indications 730.

In some examples, the base station 702 may transmit a grouping indication corresponding to the respective groupings of the plurality of UEs. In some examples, the grouping indication may indicate to the UE 704 to which UE group the UE 704 belongs (e.g., the UE 704 is the first UE 404a of the first UE group 410a of FIG. 4). In some examples, the grouping indication may indicate to the UE 704 the other UEs included in the UE group with the UE 704 (e.g., the first UE group 410a also includes the second UE 404b, the fifth UE 406a, and the sixth UE 406b).

The indications 730 may also include a hopping pattern indication. In some examples, the hopping pattern indication identifies a hopping pattern that is based on a predetermined hopping pattern. In some examples, the hopping pattern indication may indicate a subband and a slot within which a respective group of UEs is to perform interference measurement. For example, referring to the hopping pattern 500 of FIG. 5, the hopping pattern indication may indicate that the UE 704 is to perform interference measurements within the subbands 1 and 3 of slot 1, within the subband 2 of slot 2, within the subbands 1 and 2 of slot 3, etc.

The UE 704 may use the indications 730 to determine when to perform the interference measurements (e.g., based on the hopping pattern indication) and for which corresponding reference signals to perform the interference measurements (e.g., based on the grouping indication).

As shown in FIG. 7, the base station 702 may transmit reference signals 740 to the plurality of UEs 703, including the UE 704. In some examples, the reference signals 740 transmitted by the base station 702 may include CSI-RS (e.g., the CSI-RS 602 of FIG. 6A and/or the CSI-RS 652 of FIG. 6B). However, in other examples, the base station 702 may transmit additional or alternative reference signals to the plurality of UEs 703. In some examples, the base station 702 transmits the reference signals 740 to the plurality of UEs 703 based on the groupings and the indicated hopping pattern. For example, referring to the hopping pattern 500 of FIG. 5, the base station 702 may transmit the reference signals 740 to the UEs of the UE group 1 (e.g., the first UE group 410a of FIG. 4) within the subbands 1 and 3 of slot 1, within the subband 2 of slot 2, within the subbands 1 and 2 of slot 3, etc.

The base station 702 may also transmit the reference signals 740 to the respective UEs during different symbols. For example, referring to the example interference measurement pattern 600 of FIG. 6A, the base station 702 may transmit a first reference signal 602a to the first UE 404a during a first symbol, may transmit a second reference signal 602b to the second UE 404b during a second symbol, may transmit a third reference signal 602c to the fifth UE 406a during a third symbol, and may transmit a fourth reference signal 602d to the sixth UE 406b during a fourth symbol.

The UE 704 may measure interferences, at 750, of the reference signals 740 based on the groupings and the hopping pattern indicated by the indications 730. For example, the UE 704 may measure interference with respect to the first reference signal 602*a* transmitted by the base station 702 during the first symbol of the example interference measurement pattern 600 of FIG. 6A. It may be appreciated that the interference measured by the UE 704 with respect to the first reference signal 602*a* transmitted by the base station 702 during the first symbol may correspond to inter-cell interference as the other UEs of the first UE group 410*a* may be listening and not transmitting during the first symbol. The UE 704 may also measure interference with respect to the other reference signals transmitted to the other UEs of the first UE group 410*a*. For example, the UE 704 may measure interference with respect to the second reference signal 602*b* transmitted to the second UE 404*b* during the second symbol, may measure interference with respect to the third reference signal 602*c* transmitted to the fifth UE 406*a* during the third symbol, and may measure interference with respect to the fourth reference signal 602*d* transmitted to the sixth UE 406*b* during the fourth symbol.

In the illustrated example, the UE 704 reports 760 the measured interference to the base station 702. In some examples, the UE 704 may transmit a different report for each measured interference corresponding to each respective reference signal. In some examples, the UE 704 may transmit the report 760 including the mutual interference measured by the UE 704 with respect to the reference signals transmitted to the other UEs of the respective UE group. In some examples, the report 760 may also include the inter-cell interference measured by the UE 704 with respect to the reference signal transmitted to and received by the UE 704. In some examples, the UE 704 may process the measured interferences and then transmit the report 760 to the base station 702. In some examples, the UE 704 transmits the report 760 via a PUCCH.

After the base station 702 receives the reports 760 of measured interference by each of the plurality of UEs 703 (including the UE 704), the base station 702 may then determine, at 770, a schedule 780 for transmissions based on the received reports 760. For example, the base station 702 may determine, based on the reports 760, which subband and through which transmit beam to schedule each of the UEs. The base station 702 may then transmit the schedules 780 to the respective UEs. In some examples, the base station 702 transmits the schedules 780 via DCI signaling, via RRC signaling, and/or via a MAC-CE.

Figure 8:
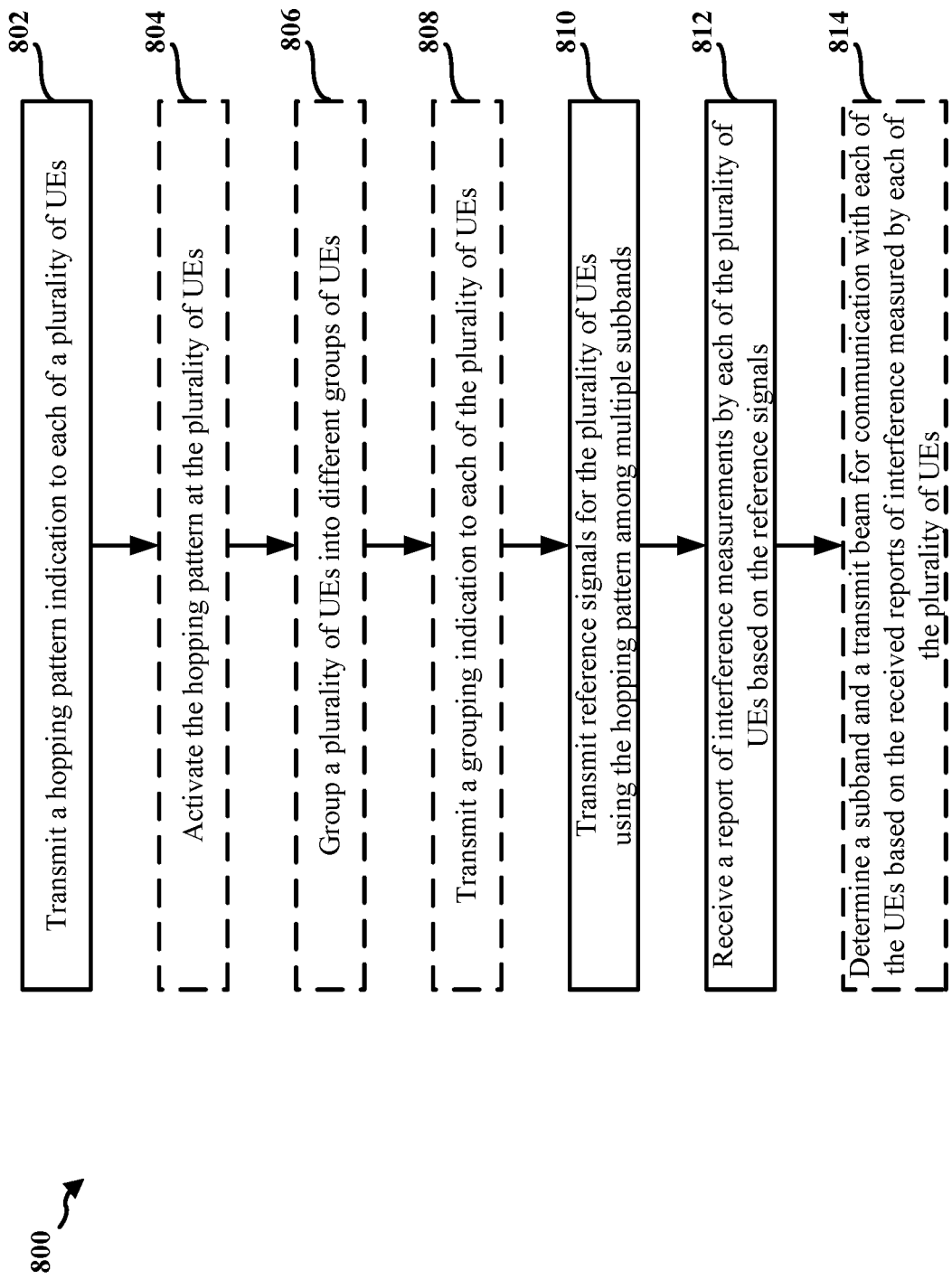
FIG. 8 is a flowchart of a method of wireless communication at a base station, in accordance with the teachings disclosed herein.

FIG. 8 is a flowchart 800 of a method of wireless communication. The method may be performed by a base station (e.g., the base station 102/180, the base station 310, the base station 402, and/or the base station 702; the apparatus 902). Optional aspects are illustrated with a dashed. The method may facilitate providing preconfigured hopping patterns to a plurality of UEs, thereby enabling the base station to convey resource signal resource configurations in a concise manner and reducing signaling overhead.

At 802, the base station transmits a hopping pattern indication to each of a plurality of UEs, as described in connection with the indications 730 of FIG. 7. For example, the transmitting of the hopping pattern indication may be performed by an indication transmitting component 940 of the apparatus 902 of FIG. 9. In some examples, the hopping pattern indication may be transmitted and activate a hopping pattern at the plurality of UEs via RRC signaling. In some examples, the base station may transmit the hopping pattern indication to the plurality of UEs via RRC signaling (e.g., without activating the corresponding hopping pattern). The base station may then, at B04, activate the hopping pattern at the plurality of UEs at a later time, as described in connection with the hopping pattern activation signal 732 of FIG. 7. For example, the base station may activate the hopping pattern at a later time (e.g., after the transmitting of the hopping pattern indication). In some examples, an activation component 942 of the apparatus 902 of FIG. 9 may activate the hopping pattern. The base station may activate the hopping pattern by using a MAC-CE or DCI.

In some examples, the hopping pattern indication may indicate a subband and a slot within which a respective group of UEs of the plurality of UEs is to perform interference measurement. In some examples, the hopping pattern may be based on a predetermined hopping pattern.

At 806, the base station may group the plurality of UEs into different groups of UEs, as described in connection with 720 of FIG. 7. For example, the grouping of the plurality of UEs into different groups of UEs may be performed by a UE grouping component 944 of the apparatus 902 of FIG. 9. In some examples, the plurality of UEs may be grouped based on spatial characteristics associated with each of the UEs.

In some examples, the plurality of UEs may include a first set of UEs associated with a first beam and a second set of UEs associated with a second beam. In some such examples, the grouping of the plurality of UEs may include identifying a first group including at least one UE from the first set of UEs and at least one UE from the second set of UEs and identifying a second group including at least one UE from the first set of UEs and at least one UE from the second set of UEs, and where each of the UEs of the first group are different than each of the UEs of the second group, as described in connection with FIG. 4.

At 808, the base station may transmit a grouping indication to each of the plurality of UEs, as described in connection with the indications 730 of FIG. 7. For example, the transmitting of the grouping indication may be performed by the indication transmitting component 940 of the apparatus 902 of FIG. 9. In some examples, the grouping indication may correspond to the respective groupings of the plurality of UEs. In some examples, the transmitting of the hopping pattern indication and the grouping indication may be performed using a same transmission.

At 810, the base station transmits reference signals for the plurality of UEs using the hopping pattern among multiple subbands, as described in connection with the reference signals 740 of FIG. 7. For example, the transmitting of the reference signals may be performed by a reference signal transmitting component 946 of the apparatus 902 of FIG. 9. In some examples, the transmitting of the reference signals may be based on the hopping pattern. In some examples the transmitting of the reference signals may be based on the hopping pattern and the different groups of UEs.

At 812, the base station receives a report of interference measured by each of the plurality of UEs based on the reference signals, as described in connection with the reports 760 of FIG. 7. For example, the receiving of the report may be performed by a report receiving component 948 of the apparatus 902 of FIG. 9.

At 814, the base station may determine a subband and a transmit beam for communication with each of the UEs based on the received reports of interference measured by each of the plurality of UEs, as described in connection with 770 of FIG. 7. For example, the determining of the subband and the transmit beam may be performed by scheduling component 950 < > of the apparatus 902 of FIG. 9. In some examples, the determining of the subband and the transmit beam may include multiplexing a first communication for a first UE using a first beam and a second communication for a second UE using a second beam, as described in connection with FIG. 4.

Figure 9:
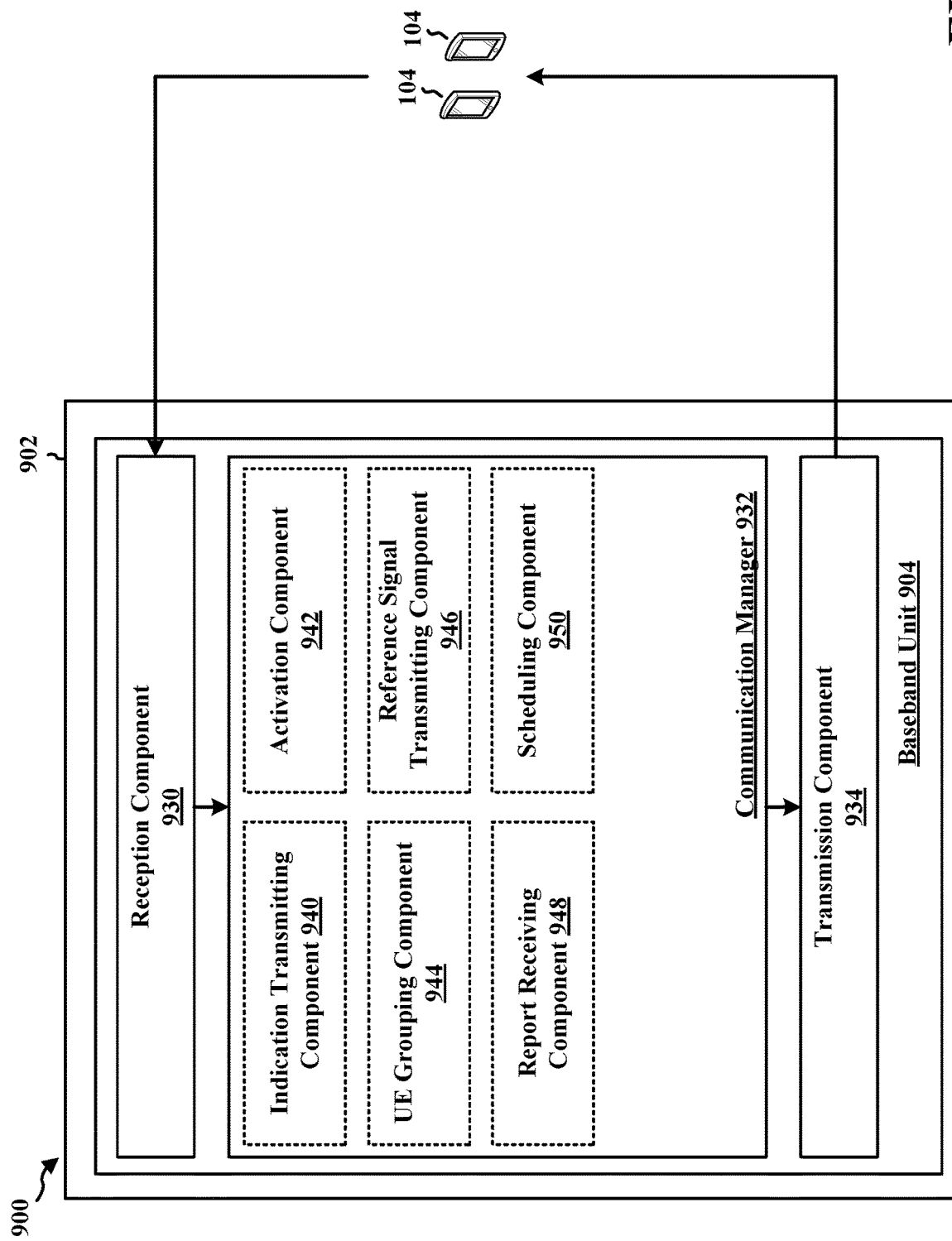
FIG. 9 is a diagram illustrating an example of a hardware implementation for an example apparatus, in accordance with the teachings disclosed herein.

FIG. 9 is a diagram 900 illustrating an example of a hardware implementation for an apparatus 902. The apparatus 902 is a base station and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 includes an indication transmitting component 940 that may be configured to facilitate transmitting a hopping pattern indication to each of a plurality of UEs and/or a grouping indication to each of the plurality of UEs, for example, as described in connection with 802 and/or 808 of FIG. 8. The communication manager 932 further includes an activation component 942 that may be configured to facilitate the hopping pattern at the plurality of UEs, for example, as described in connection with 804 of FIG. 8. The communication manager 932 further includes a UE grouping component 944 that may be configured to facilitate grouping a plurality of UEs into different groups of UEs, for example, as described in connection with 806 of FIG. 8. The communication manager 932 further includes a reference signal transmitting component 946 that may be configured to facilitate transmitting reference signals for the plurality of UEs using the hopping pattern among multiple subbands, for example, as described in connection with 810 of FIG. 8. The communication manager 932 further includes a report receiving component 948 that may be configured to facilitate receiving a report of interference measurements by each of the plurality of UEs based on the reference signals, for example, as described in connection with 812 of FIG. 8. The communication manager 932 further includes a scheduling component 950 that may be configured to facilitate determining a subband and a transmit beam for communication with each of the UEs, for example, as described in connection with as described in connection with 814 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting a hopping pattern indication to each of a plurality of UEs, the hopping pattern indication corresponding to a hopping pattern for the plurality of UEs. The example apparatus 902 may also include means for transmitting reference signals for the plurality of UEs using the hopping pattern among multiple subbands. The example apparatus 902 may also include means for receiving a report of interference measured by each of the plurality of UEs based on the reference signals. The example apparatus 902 may also include means for transmitting the hopping pattern indication and activating the configured hopping pattern at the plurality of UEs via RRC signaling. The example apparatus 902 may also include means for transmitting the hopping pattern indication via RRC signaling and activating the configured hopping pattern at the plurality of UEs using a MAC-CE or DCI. The example apparatus 902 may also include means for grouping the plurality of UEs into different groups of UEs. The example apparatus 902 may also include means for grouping the plurality of UEs based on spatial characteristics associated with each of the UEs. The example apparatus 902 may also include means for transmitting a grouping indication to each of the plurality of UEs, the grouping indication corresponding to the respective groupings of the plurality of UEs. The example apparatus 902 may also include means for determining a subband and a transmit beam for communication with each of the UEs based on the received reports of interference measured by each of the plurality of UEs. The example apparatus 902 may also include means for multiplexing a first communication with a first UE using a first beam and a second communication with a second UE using a second beam.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
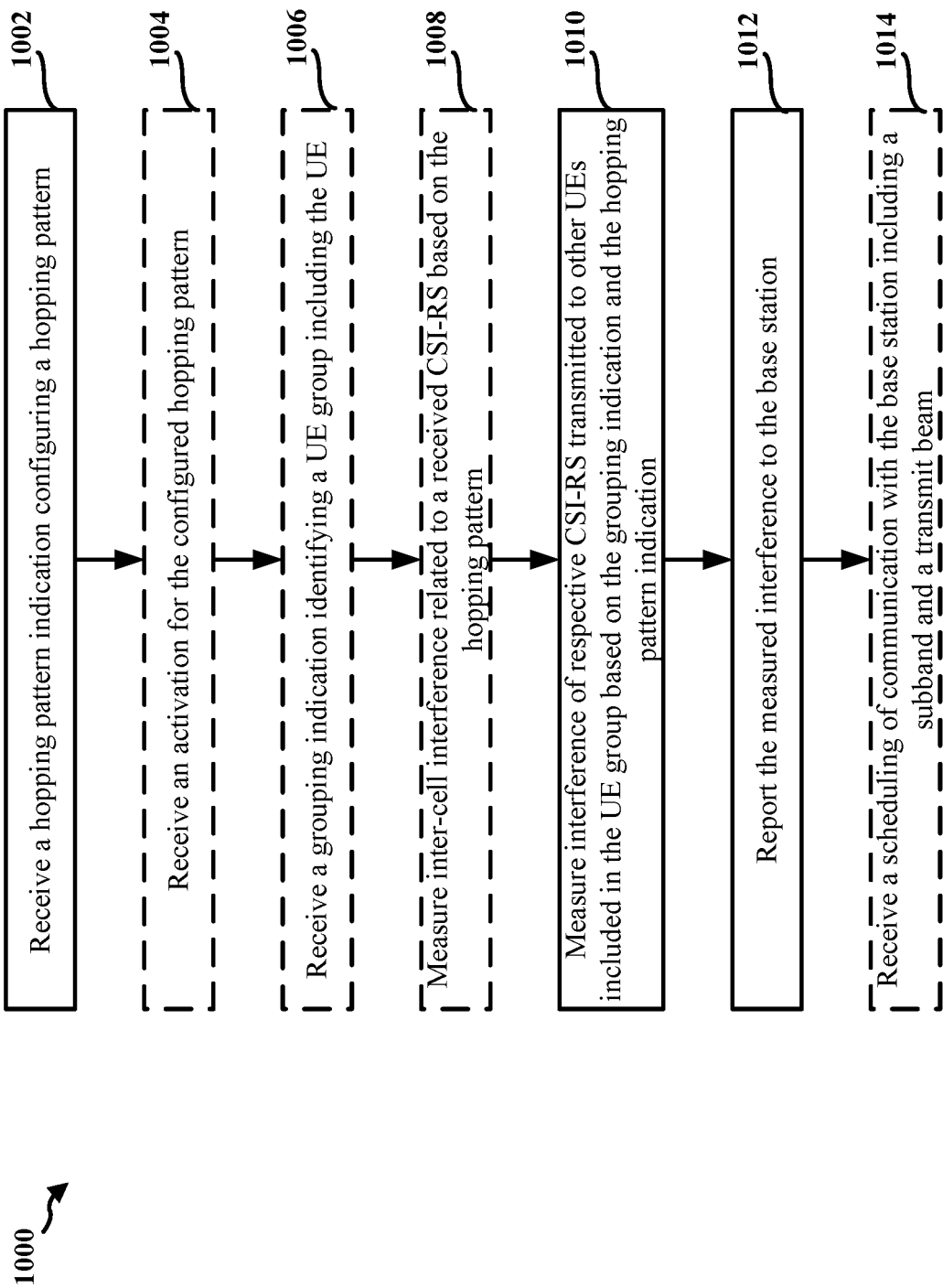
FIG. 10 is a flowchart of a method of wireless communication at a UE, in accordance with the teachings disclosed herein.

FIG. 10 is a flowchart 1000 of a method of wireless communication. The method may be performed by a UE (e.g., the UE 104; the apparatus 1102). Optional aspects are illustrated with a dashed. The method may facilitate using preconfigured hopping patterns by a plurality of UEs, thereby enabling resource signal resource configurations to be conveyed in a concise manner and reducing signaling overhead.

At 1002, the UE receives a hopping pattern indication configuring a hopping pattern, as described in connection with the indications 730 of FIG. 7. For example, the receiving of the hopping pattern indication may be performed by an indications receiving component 1140 of the apparatus 1102 of FIG. 11. In some examples, the hopping pattern may correspond to performing interference measurements. In some examples, the configured hopping pattern may indicate a subband and a slot within which the UE is to perform interference measurement. In some examples, the configured hopping pattern may be based on a predetermined hopping pattern.

In some examples, the hopping pattern indication may be received and the configured hopping pattern may be activated via RRC signaling. In some examples, the hopping pattern indication may be received via RRC signaling and the configured hopping pattern may be activated at a later time. For example, at 1004, the UE may receive an activation for the configured hopping pattern, as described in connection with the hopping pattern activation signal 732 of FIG. 7. For example, the receiving of the activation for the configured hopping pattern may be performed by an activation component 1142 of the apparatus 1102 of FIG. 11. In some examples, the UE may receive the activation for the configured hopping pattern via a MAC-CE or via DCI.

At 1006, the UE may receive a grouping indication identifying a UE group including the UE, as described in connection with the indications 730 of FIG. 7. For example, the receiving of the grouping indication may be performed by the indications receiving component 1140 of the apparatus 1102 of FIG. 11. In some examples, the UE group may be determined based on a grouping of a plurality of UEs into different groups of UEs. In some examples, the grouping of the plurality of UEs may be based on spatial characteristics associated with each of the UEs.

At 1010, the UE measures interference of respective CSI-RS transmitted to other UEs included in a UE group based on at least the hopping pattern indication, as described in connection with 750 of FIG. 7. For example, the measuring of the interference may be performed by an interference measuring component 1144 of the apparatus 1102 of FIG. 11.

At 1012, the UE reports the measured interference to the base station, as described in connection with the reports 760 of FIG. 7. For example, the reporting of the measured interference may be performed by a reporting component 1146 of the apparatus 1102 of FIG. 11.

At 1014, the UE may receive a scheduling of communications with the base station including a subband and a transmit beam, as described in connection with the schedule 780 of FIG. 7. For example, the receiving of the scheduling of communications may be performed by a schedule receiving component 1148 of the apparatus 1102 of FIG. 11.

In some examples, the UE may measure, at 1008, inter-cell interference of a CSI-RS transmitted to the UE based on the configured hopping pattern, as described in connection with 750 of FIG. 7. For example, the measuring of the inter-cell interference may be performed by the interference measuring component 1144 of the apparatus 1102 of FIG. 11. In some such examples, the reporting of the measured interference (e.g., at 1012) may include the measured inter-cell interference and the interference measured with respective to the respective CSI-RSs transmitted to the other UEs.

Figure 11:
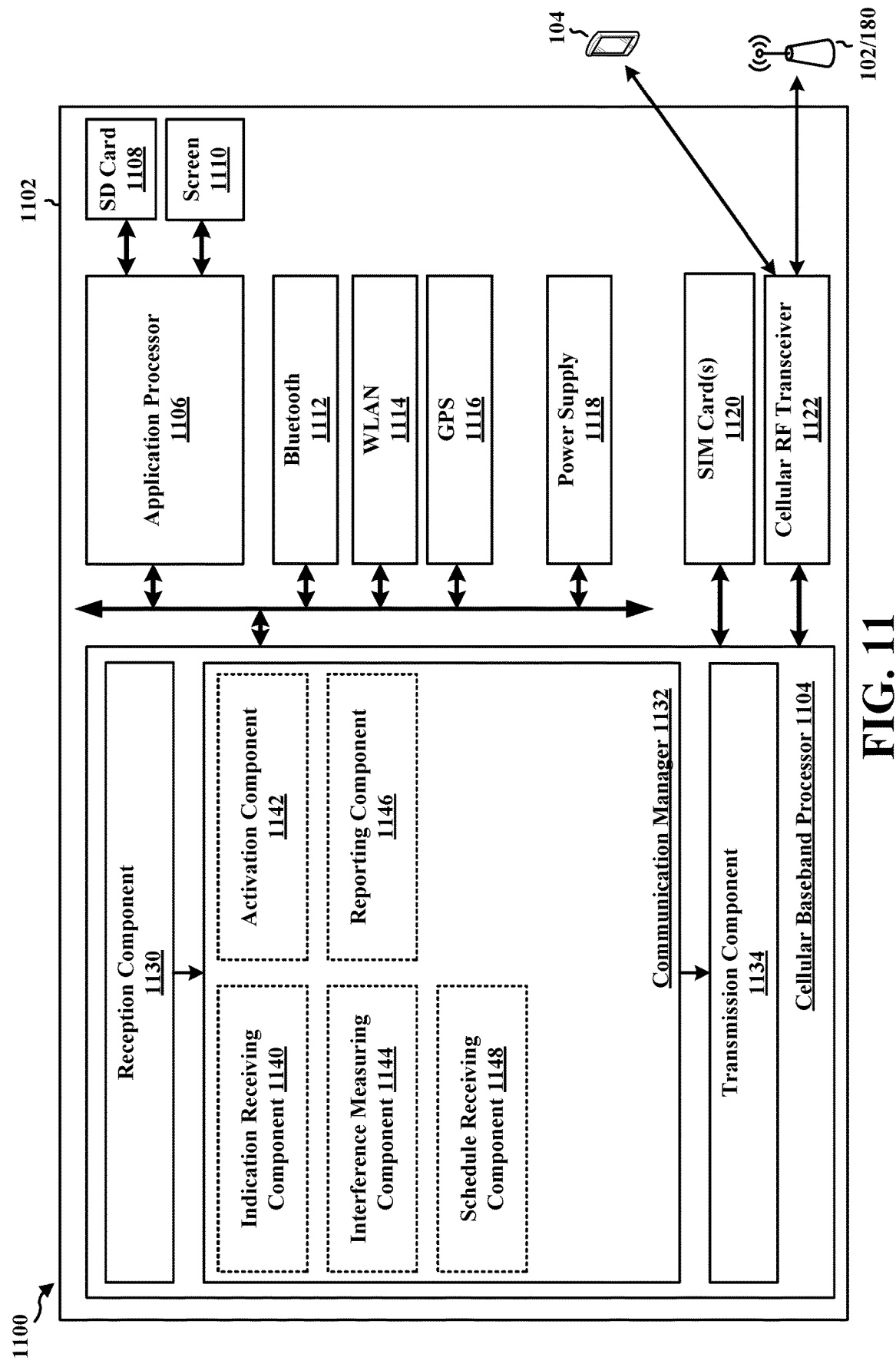
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or base station 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see the UE 350 of FIG. 3) and include the aforediscussed additional modules of the apparatus 1102.

The communication manager 1132 includes an indications receiving component 1140 that is configured to receiving a hopping pattern indication configuring a hopping pattern and/or receiving a grouping indication identifying a UE group including the UE, for example, as described in connection with 1002 and/or 1006 of FIG. 10. The communication manager 1132 further includes an activation component 1142 that is configured to receiving an activation for the configured hopping pattern, for example, as described in connection with 1004 of FIG. 10. The communication manager 1132 further includes an interference measuring component 1144 that is configured to measure inter-cell interference related to a received CSI-RS based on the hopping pattern and/or measure interference of respective CSI-RS transmitted to other UEs included in the UE group based on the grouping indication and the hopping pattern indication, for example, as described in connection with 1008 and/or 1010 of FIG. 10. The communication manager 1132 further includes a reporting component 1146 that is configured to report the measured interference to the base station, for example, as described in connection with 1012 of FIG. 10. The communication manager 1132 further includes a schedule receiving component 1148 that is configured to receive a scheduling of communications with the base station including a subband and a transmit beam, for example, as described in connection with 1014 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from a base station, a hopping pattern indication configuring a hopping pattern. The example apparatus 1102 may also include means for measuring interference of respective CSI-RS transmitted to other UEs included in a UE group based on at least the hopping pattern indication. The example apparatus 1102 may also include means for reporting the measured interference to the base station. The example apparatus 1102 may also include means for receiving the hopping pattern indication and activating the configured hopping pattern via RRC signaling. The example apparatus 1102 may also include means for receiving the hopping pattern indication via RRC signaling and activating the configured hopping pattern using a MAC-CE or DCI. The example apparatus 1102 may also include means for receiving a grouping indication identifying a UE group including the UE. The example apparatus 1102 may also include means for receiving a scheduling of communication with the base station including a subband and a transmit beam. The example apparatus 1102 may also include means for measuring inter-cell interference of a CSI-RS transmitted to the UE based on the configured hopping pattern.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Example techniques disclosed herein facilitate signaling of a hopping pattern (e.g., a hopping pattern indication) to a plurality of UEs. The hopping pattern indication may indicate a predetermined hopping pattern and may be provided to a plurality of UEs by a base station via multicast or broadcast transmissions. In some examples, the base station may use RRC signaling to configure and activate the hopping pattern(s) at the plurality of UEs. In some examples, the base station may use RRC signaling to configure the hopping pattern(s) at the plurality of UEs and employ MAC-CE or DCI to activate the hopping pattern(s) at the plurality of UEs.

The following examples are illustrative only and may be combined with aspects of other embodiments or teachings described herein, without limitation.

Example 1 is a method of wireless communication at a base station, comprising: transmitting a hopping pattern indication to each of a plurality of user equipment (UEs), the hopping pattern indication configuring a hopping pattern for the plurality of UEs; transmitting reference signals for the plurality of UEs using the hopping pattern among multiple subbands; and receiving a report of interference measured by each of the plurality of UEs based on the reference signals.

In Example 2, the method of Example 1 further includes that the hopping pattern indication is transmitted and the configured hopping pattern is activated at the plurality of UEs via radio resource control (RRC) signaling.

In Example 3, the method of any of Example 1 or Example 2 further includes that the hopping pattern indication is transmitted to the plurality of UEs via radio resource control (RRC) signaling and the configured hopping pattern is activated at the plurality of UEs using a medium access control-control element (MAC-CE) signaling or downlink control information (DCI).

In Example 4, the method of any of Examples 1 to 3 further includes that the hopping pattern indication indicates a subband and a slot within which a respective group of UEs of the plurality of UEs is to perform interference measurement.

In Example 5, the method of any of Examples 1 to 4 further includes that the hopping pattern is based on a predetermined hopping pattern.

In Example 6, the method of any of Examples 1 to 5 further includes: grouping the plurality of UEs into different groups of UEs, and wherein the transmitting of the reference signals for the plurality of UEs is based on the hopping pattern and the different groups of UEs.

In Example 7, the method of any of Examples 1 to 6 further includes that the plurality of UEs are grouped based on spatial characteristics associated with each of the UEs.

In Example 8, the method of any of Examples 1 to 7 further includes that the plurality of UEs includes a first set of UEs associated with a first beam and a second set of UEs associated with a second beam, wherein the grouping of the plurality of UEs includes identifying a first group including at least one UE from the first set of UEs and at least one UE from the second set of UEs and identifying a second group including at least one UE from the first set of UEs and at least one UE from the second set of UEs, and wherein each of the UEs of the first group are different than each of the UEs of the second group.

In Example 9, the method of any of Examples 1 to 8 further includes transmitting a grouping indication to each of the plurality of UEs, the grouping indication corresponding to the respective groupings of the plurality of UEs.

In Example 10, the method of any of Examples 1 to 9 further includes determining a subband and a transmit beam for communication with each of the UEs based on the received reports of interference measured by each of the plurality of UEs.

In Example 11, the method of any of Examples 1 to 10 further includes that the determining of the subband and the transmit beam includes multiplexing a first communication with a first UE using a first beam and a second communication with a second UE using a second beam.

Example 12 is a device including one or more processors and one or more memories in electronic communication with the one or more processors storing instructions executable by the one or more processors to cause a system or an apparatus to implement a method as in any of Examples 1 to 11.

Example 13 is a system or apparatus including means for implementing a method or realizing an apparatus as in any of Examples 1 to 11.

Example 14 is a non-transitory computer-readable medium storing instructions executable by one or more processors to cause the one or more processors to implement a method as in any of Examples 1 to 11.

Example 15 is a method of wireless communication at a user equipment (UE), comprising: receiving, from a base station, a hopping pattern indication configuring a hopping pattern; measuring interference of respective channel state information (CSI) reference signals (RS) transmitted to other UEs included in a UE group based on at least the hopping pattern indication; and reporting the measured interference to the base station.

In Example 16, the method of Example 15 further includes that the hopping pattern indication is received and the configured hopping pattern is activated via radio resource control (RRC) signaling.

In Example 17, the method of any of Example 15 or Example 16 further includes that the hopping pattern indication is received via radio resource control (RRC) signaling and the configured hopping pattern is activated using a medium access control-control element (MAC-CE) signaling or downlink control information (DCI).

In Example 18, the method of any of Examples 15 to 17 further includes that the configured hopping pattern indicates a subband and a slot within which the UE is to perform interference measurement.

In Example 19, the method of any of Examples 15 to 18 further includes that the configured hopping pattern is based on a predetermined hopping pattern.

In Example 20, the method of any of Examples 15 to 19 further includes: receiving a grouping indication identifying a UE group including the UE, and wherein the measuring of the interference of respective CSI-RS transmitted to the other UEs is further based on the grouping indication.

In Example 21, the method of any of Examples 15 to 20 further includes that the UE group is determined based on a grouping of a plurality of UEs into different groups of UEs.

In Example 22, the method of any of Examples 15 to 21 further includes that the grouping of the plurality of UEs is based on spatial characteristics associated with each of the UEs.

In Example 23, the method of any of Examples 15 to 22 further includes: receiving a scheduling of communication with the base station including a subband and a transmit beam, wherein the communication is scheduled based on the measured interference reported to the base station.

In Example 24, the method of any of Examples 15 to 23 further includes: measuring inter-cell interference of a CSI-RS transmitted to the UE based on the configured hopping pattern, and wherein the reporting of the measured interference to the base station includes the measured inter-cell interference and the interference measured with respect to the respective CSI RSs transmitted to the other UEs.

Example 25 is a device including one or more processors and one or more memories in electronic communication with the one or more processors storing instructions executable by the one or more processors to cause a system or an apparatus to implement a method as in any of Examples 15 to 24.

Example 26 is a system or apparatus including means for implementing a method or realizing an apparatus as in any of Examples 15 to 24.

Example 27 is a non-transitory computer-readable medium storing instructions executable by one or more processors to cause the one or more processors to implement a method as in any of Examples 15 to 24.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    transmitting a hopping pattern indication to each of a plurality of user equipment (UEs), the hopping pattern indication configuring a hopping pattern for the plurality of UEs;
    grouping the plurality of UEs into different groups of UEs, the plurality of UEs including a first set of UEs associated with a first beam and a second set of UEs associated with a second beam, and grouping of each UE of the plurality of UEs including:
        identifying a first group including at least a first UE from the first set of UEs and at least a first UE from the second set of UEs; and
        identifying a second group including at least a second UE from the first set of UEs and at least a second UE from the second set of UEs, and UEs of the first group being different than UEs of the second group;
    transmitting reference signals for the plurality of UEs based on the different groups of UEs and using the hopping pattern among multiple subbands, the reference signals selected based in part on different beams among the multiple subbands used to communicate with respective UEs of the plurality of UEs; and
    receiving a report of measured interference from each of the plurality of UEs based on the reference signals.

2. The method of claim 1, wherein the hopping pattern indication is transmitted and the hopping pattern is activated at the plurality of UEs via radio resource control (RRC) signaling.

3. The method of claim 1, wherein the hopping pattern indication is transmitted to the plurality of UEs via radio resource control (RRC) signaling and the hopping pattern is activated at the plurality of UEs using a medium access control—control element (MAC-CE) signaling or downlink control information (DCI).

4. The method of claim 1, wherein the hopping pattern indication indicates a subband and a slot within which a respective group of UEs of the plurality of UEs is to perform interference measurement.

5. The method of claim 1, wherein the hopping pattern is based on a predetermined hopping pattern.

6. The method of claim 1, wherein grouping the plurality of UEs is based on spatial characteristics associated with each UE of the plurality of UEs.

7. The method of claim 1, further comprising:
transmitting a grouping indication to each of the plurality of UEs, the grouping indication corresponding to respective groupings of the plurality of UEs.

8. The method of claim 1, further comprising:
determining a subband and a transmit beam for communication with each UE of the plurality of UEs based on the report of the measured interference from each of the plurality of UEs.

9. The method of claim 8, wherein determining the subband and the transmit beam includes multiplexing a first communication with a third UE using a third beam and a second communication with a fourth UE using a fourth beam.

10. An apparatus for wireless communication, comprising:
a memory; and
at least one processor coupled to the memory and configured to:
transmit a hopping pattern indication to each of a plurality of user equipment (UEs), the hopping pattern indication configuring a hopping pattern for the plurality of UEs;
group the plurality of UEs into different groups of UEs, the plurality of UEs including a first set of UEs associated with a first beam and a second set of UEs associated with a second beam, and grouping each UE of the plurality of UEs to include:
identifying a first group including at least a first UE from the first set of UEs and at least a first UE from the second set of UEs; and
identifying a second group including at least a second UE from the first set of UEs and at least a second UE from the second set of UEs, and UEs of the first group being different than UEs of the second group;
transmit reference signals for the plurality of UEs based on the different groups of UEs and using the hopping pattern among multiple subbands, the reference signals selected based in part on different beams among the multiple subbands used to communicate with respective UEs of the plurality of UEs; and
receive a report of measured interference from each of the plurality of UEs based on the reference signals.

11. A method of wireless communication at a user equipment (UE), comprising:
receiving, from a base station, a hopping pattern indication configuring a hopping pattern;
measuring an interference of respective reference signals transmitted to other UEs included in a UE group based on at least the hopping pattern indication, the respective reference signals selected based in part on different beams among multiple subbands used to communicate with the base station, the UE group being based on grouping a plurality of UEs into different UE groups, the plurality of UEs including a first set of UEs associated with a first beam and a second set of UEs associated with a second beam, the UE group including at least one UE from the first set of UEs and at least one UE from the second set of UEs; and
transmitting a report including the interference to the base station.

12. The method of claim 11, wherein the hopping pattern indication is received and the hopping pattern is activated via radio resource control (RRC) signaling.

13. The method of claim 11, wherein the hopping pattern indication is received via radio resource control (RRC) signaling and the hopping pattern is activated using a medium access control—control element (MAC-CE) signaling or downlink control information (DCI).

14. The method of claim 11, wherein the hopping pattern indicates a subband and a slot within which the UE is to perform interference measurement.

15. The method of claim 11, wherein the hopping pattern is based on a predetermined hopping pattern.

16. The method of claim 11, further comprising:
receiving a grouping indication identifying the UE group including the UE, and wherein measuring the interference of the respective reference signals transmitted to the other UEs is further based on the grouping indication.

17. The method of claim 11, wherein grouping the UE and the other UEs is based on spatial characteristics associated with each UE of the UE group.

18. The method of claim 11, further comprising:
receiving a scheduling of communication with the base station including a subband and a transmit beam, wherein the communication is scheduled based on the interference reported to the base station.

19. The method of claim 11, further comprising:
measuring inter-cell interference of a first reference signal received from the base station based on the hopping pattern, and wherein the report includes the inter-cell interference and the interference measured with respect to the respective reference signals transmitted to the other UEs.

20. An apparatus for wireless communication, comprising:
a memory; and
at least one processor coupled to the memory and configured to:
receive, from a base station, a hopping pattern indication configuring a hopping pattern;
measure an interference of respective reference signals transmitted to other UEs included in a UE group based on at least the hopping pattern indication, the respective reference signals selected based in part on different beams among multiple subbands used to communicate with the base station, the UE group being based on grouping a plurality of UEs into different UE groups, the plurality of UEs including a first set of UEs associated with a first beam and a second set of UEs associated with a second beam, the UE group including at least one UE from the first set of UEs and at least one UE from the second set of UEs; and
transmit a report including the interference to the base station.

* * * * *